L. W. MITCHELL.
NUT LOCK.
APPLICATION FILED MAR. 18, 1916.
1,216,833.
Patented Feb. 20, 1917.
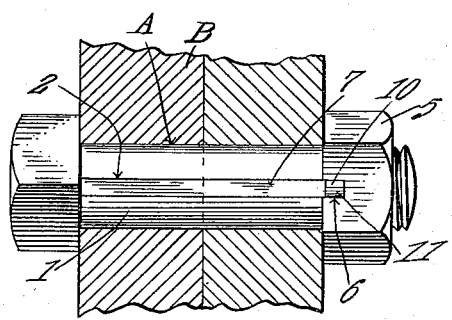
Fig. 1.
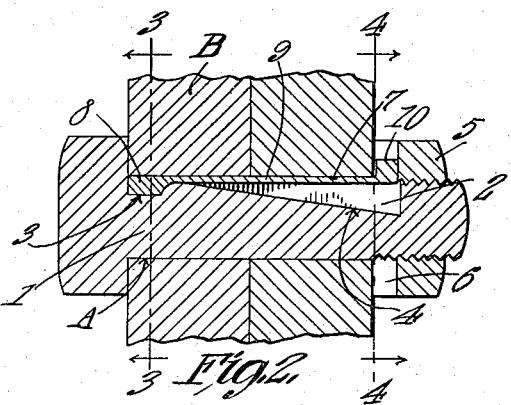
Fig. 2.
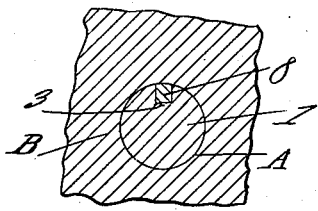
Fig. 3.
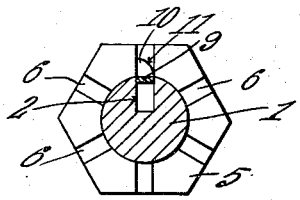
Fig. 4.
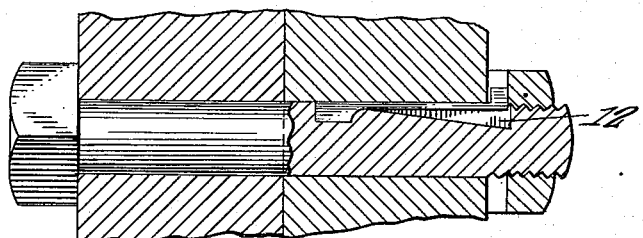
Fig. 5.
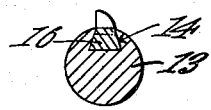
Fig. 8.
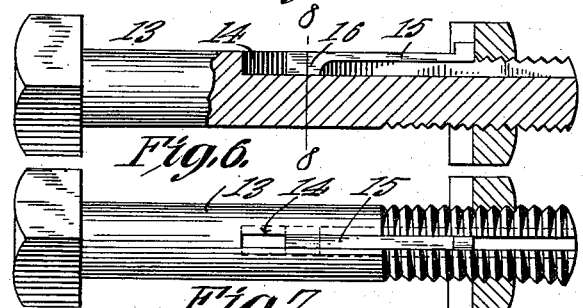
Fig. 6.
Fig. 7.
Witnesses
J. P. Tomlin
R. L. Barker
L. W. Mitchell, Inventor
by C. A. Snow & Co.
Attorneys

UNITED STATES PATENT OFFICE.

LUTHER W. MITCHELL, OF ABANDA, ALABAMA.

NUT-LOCK.

1,216,833.  Specification of Letters Patent.  Patented Feb. 20, 1917.

Application filed March 18, 1916. Serial No. 85,105.

*To all whom it may concern:*

Be it known that I, LUTHER W. MITCHELL, a citizen of the United States, residing at Abanda, in the county of Chambers and State of Alabama, have invented a new and useful Nut-Lock, of which the following is a specification.

This invention relates to nut locks and has for an object thereof, the provision of a nut lock embodying means for effectively locking the nut upon its bolt against retrograde movement, but which will in no way interfere with the ready application of the nut to its bolt.

A further object of the present invention is to provide a nut lock of generally improved construction, whereby the device will be simple, durable and inexpensive in construction, as well as convenient, practical, serviceable and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention has been illustrated in its preferred embodiments in the accompanying drawings, wherein:—

Figure 1 is a side elevation of the improved nut lock.

Fig. 2 is a longitudinal sectional view of the improved nut lock.

Fig. 3 is a transverse sectional view taken on the line 3—3 of Fig. 2.

Fig. 4 is a transverse sectional view taken on the line 4—4 of Fig. 2.

Fig. 5 is a longitudinal view of a modified form of the invention.

Fig. 6 is a longitudinal sectional view of another modified form of the invention.

Fig. 7 is a side elevation of the form of the invention depicted in Fig. 6.

Fig. 8 is a transverse section taken on the line 8—8 of Fig. 6.

In carrying out the present invention there is provided the bolt 1, having a longitudinal radial groove 2, extending inwardly from the periphery thereof, and in the form of the invention depicted in Figs. 1 to 4, inclusive, this groove extends longitudinally from the head of the bolt 1 to a point adjacent its outer or threaded end. The groove 2 is radially enlarged at that end which is adjacent the head of the bolt 1, to provide a rectangular recess 3, while the remaining portion of the groove, or that portion which is adjacent the threaded end of the bolt 1, is gradually deepened to provide a tapered recess 4.

A nut 5 is screwed upon the threaded end of the bolt 1, and has a plurality of diametrically opposed radial grooves 6, extending inwardly from the inner face thereof.

In order to lock the nut 5 against retrograde movement with respect to the bolt 1, there is provided a resilient key or locking member 7 having an enlarged rectangular lug 8 formed at one end thereof and an intermediate flat resilient portion 9. A radial finger or detent 10 extends from that end of the intermediate portion 9 which is remote from the lug 8. The finger or detent 10 has one face beveled as indicated at 11.

In practical use the resilient key 7 is placed within the longitudinal groove 2 of the bolt 1, after which the bolt 1 is passed through the apertures A of the object B, which is to be secured by this device, and during the passing of the bolt through the apertures A, the finger or detent 10 is placed within the tapered recess 4.

After the insertion of the bolt 1 into the aperture A, the wall of the aperture holds the rectangular lug 8 securely within the recess 3, thereby causing the intermediate resilient portion 9 to yieldingly hold the finger or detent 10 out beyond the periphery of the bolt 1 and in the path of the nut 5. Now, the nut 5 is screwed upon the bolt 1, and during the inward or advancing rotations of the nut, it will contact with the detent 10, but owing to the beveled face 11 of the detent 10, the nut is not restricted in its advance movement. When the nut 5 has been finally screwed against the material, then the finger or detent 10 will snap into one of the radial grooves 6 of the nut 5 and effectively lock the nut against retrograde movement. But, should it be desired to remove the nut 5, this may readily be accomplished by inserting a suitable tool into the radial groove 6 and pressing the detent 10 into the tapered recess, thereby allowing the nut 5 to be readily unscrewed.

The form of the invention depicted in Fig. 5 is similar to the above described nut lock, except that the groove 12, which corresponds to the groove 2, does not extend to the head of the bolt but terminates intermediate the ends of the bolt, as shown. This form of the invention is employed in connection with relatively long bolts, thereby eliminating the expense of cutting the groove 12 to the head of the bolt.

Another modification is illustrated in Figs. 6, 7 and 8. In this form of the invention the bolt 13 is provided with a longitudinal dovetailed groove extending inwardly from the periphery thereof and longitudinally from an intermediate portion of the bolt 13 to its outer or threaded end. A resilient key 15 is slidably received by the groove 14, which key is similar to the key 7, except that a beveled or dove-tailed lug 16 is substituted in lieu of the rectangular lug 8. This form of the invention may be employed to secure materials of various dimensions, by simply sliding the lug 16 along the groove 14 until the proper adjustment has been made, after which the above described operation is repeated to lock the nut against retrograde movement relative to the bolt 13.

Having thus described my invention what is claimed as new is:—

A bolt having a longitudinal groove provided at one end with a recess, said groove being shallow adjacent to said recess and increasing in depth from said recess to its other end, and a flat spring disposed within said groove and having a lug at one end seated in said recess, the other end of the spring being free and having an outstanding portion to engage grooves of a nut threaded upon the bolt.

In testimony that I claim the foregoing as my own, I have hereto affixed my signature in the presence of two witnesses.

LUTHER W. MITCHELL.

Witnesses:
WILLIAM H. RISU,
W. R. CHATFIELD.